United States Patent
Von Hein et al.

(10) Patent No.: US 11,526,401 B2
(45) Date of Patent: Dec. 13, 2022

(54) GROUPING OF MULTIPLE CONCURRENT SCHEDULES OF POINT-IN-TIME SNAPSHOTS FOR CONSISTENTLY DEFINED DATA IMAGE PROTECTION

(71) Applicant: EMC IP HOLDING COMPANY LLC, Hopkinton, MA (US)

(72) Inventors: Nicholas Von Hein, Riverside, RI (US); Michael Ferrari, Douglas, MA (US); Daryl Kinney, Hopkinton, MA (US); Shakil Anwar, Westborough, MA (US); Tao Tao, Cambridge, MA (US)

(73) Assignee: Dell Products L.P., Hopkinton, MA (US)

(*) Notice: Subject to any disclaimer, the term of this patent is extended or adjusted under 35 U.S.C. 154(b) by 221 days.

(21) Appl. No.: 16/886,840

(22) Filed: May 29, 2020

(65) Prior Publication Data

US 2021/0374007 A1 Dec. 2, 2021

(51) Int. Cl.
*G06F 16/11* (2019.01)
*G06F 11/14* (2006.01)

(52) U.S. Cl.
CPC ........ *G06F 11/1448* (2013.01); *G06F 16/128* (2019.01); *G06F 2201/80* (2013.01); *G06F 2201/84* (2013.01)

(58) Field of Classification Search
CPC .............. G06F 11/1448; G06F 16/128; G06F 2201/08; G06F 2201/84
USPC ........................................................ 707/649
See application file for complete search history.

(56) References Cited

U.S. PATENT DOCUMENTS

| | | | | |
|---|---|---|---|---|
| 9,529,808 | B1* | 12/2016 | Sudarsanam | G06F 16/211 |
| 9,824,095 | B1* | 11/2017 | Taylor | G06F 16/11 |
| 2012/0123999 | A1* | 5/2012 | Ashutosh | G06F 16/128 |
| | | | | 707/618 |
| 2016/0077926 | A1* | 3/2016 | Mutalik | G06F 3/0641 |
| | | | | 711/162 |

OTHER PUBLICATIONS

Salter, Jim. "Bitrot and atomic COWs: Inside "next-gen" filesystems". Published Jan. 15, 2014. Accessed Jan. 21, 2022 from <https://arstechnica.com/information-technology/2014/01/bitrot-and-atomic-cows-inside-next-gen-filesystems/> (Year: 2014).*

* cited by examiner

*Primary Examiner* — Robert W Beausoliel, Jr.
*Assistant Examiner* — Arthur Ganger
(74) *Attorney, Agent, or Firm* — Anderson Gorecki LLP (57) ABSTRACT

Targetless snapshot schedules are defined by policy objects that include a snap creation interval, maximum snap count, and schedule ID. Multiple schedule IDs can be associated with a single storage object to implement different concurrent targetless snapshot schedules with a single storage object. Multiple storage objects may use the same targetless snapshot schedule independently. Because the targetless snapshot schedules are implemented independently, discard of old snapshots to maintain a snap count for a first storage object does not cause discard of snapshots for a second storage object. Further, discard of old snapshots to maintain a snap count for a first schedule does not cause discard of snapshots for a second schedule applied to the same storage object.

20 Claims, 7 Drawing Sheets

GROUPING OF MULTIPLE CONCURRENT SCHEDULES OF POINT-IN-TIME SNAPSHOTS FOR CONSISTENTLY DEFINED DATA IMAGE PROTECTION

TECHNICAL FIELD

The subject matter of this disclosure is generally related to data storage systems and more particularly to targetless snapshots.

BACKGROUND

High capacity data storage systems such as storage area networks (SANs) are used to maintain large data sets and contemporaneously support many users. A SAN includes a network of interconnected computing nodes that manage access to arrays of drives. The computing nodes service block-based input-output (IO) commands from applications that run on host servers. SANs and other types of high capacity storage systems create various types of copies of datasets for data recovery and other purposes. A clone is a complete copy of a storage object such as a logical volume of storage. In contrast, snapshots (snaps) are incremental copies of a storage object. Each snap only represents the changes made since some prior point in time, e.g. since creation of the most recent snap of the storage object. Advantageously, snaps are smaller than the storage object being snapped, so snap generation requires less resources than creating a clone or other type of complete copy of the storage object.

A common technique for generating a snap of a source volume is to write changed data to a target volume (snap volume). The snap volume may be accessible to the host servers that are supported by the storage system. However, creating and managing a snap volume requires memory and other resources. Further, a single SAN may have many snap volumes, so the total amount of resources required for snaps may be significant. Targetless snaps require less resources to create than standard volume-based snaps. Targetless snaps are created as changes are made to the storage object being snapped. As new writes are made, snapshot deltas are created using tables and pointers to the original data. The snapshot deltas are accumulated over time to preserve the point-in-time and create a targetless snap. Because the snapshot deltas are not stored on a snap volume, targetless snapshots require fewer resources than standard volume-based snapshots. However, the lack of a snap volume also prevents targetless snaps from being discoverable and accessible to host servers unless the targetless snap is linked to a logical volume.

SUMMARY

All examples, aspects and features mentioned in this document can be combined in any technically possible way.

An apparatus in accordance with some implementations of the invention may comprise: a data storage system comprising a plurality of compute nodes interconnected with a plurality of drives; a storage object on which data is logically stored, the storage object being backed by the drives; and a targetless snapshot scheduler than generates targetless snapshots of the storage object, the targetless snapshot scheduler comprising: a plurality of policy objects, each policy object defining a corresponding targetless snapshot schedule; metadata that associates selected ones of the policy objects with the storage object; and instructions that independently create targetless snapshots of the storage object for each targetless snapshot schedule associated with the policy objects associated with the storage object. In some implementations each policy object comprises a count that indicates a maximum number of targetless snapshots to be maintained in accordance with the targetless snapshot schedule associated with the policy object. In some implementations each policy objects comprises a time interval that indicates an elapsed time between creation of successive targetless snapshots in accordance with the targetless snapshot schedule associated with the policy object. In some implementations each policy objects comprises a schedule ID that identifies the targetless snapshot schedule associated with the policy object. In some implementations the targetless snapshot scheduler comprises instructions that use metadata to learn which schedule IDs are associated with a selected storage object. In some implementations the targetless snapshot scheduler comprises instructions that use the learned schedule IDs to identify corresponding policy objects. In some implementations the targetless snapshot scheduler comprises instructions that apply schedules defined by the identified policy objects to the selected storage object. In some implementations the targetless snapshot scheduler comprises instructions that create new targetless snapshots at time intervals specified by the identified policy objects. In some implementations the targetless snapshot scheduler comprises instructions that discard an oldest snapshot created under a schedule if a count specified for that schedule would be exceeded by creating a new targetless snapshot under that schedule.

A method in accordance with some implementations of the invention may comprise: in a data storage system comprising a plurality of compute nodes interconnected with a plurality of drives and a storage object on which data is logically stored, the storage object being backed by the drives: maintaining a plurality of policy objects, each policy object defining a corresponding targetless snapshot schedule; associating selected ones of the policy objects with the storage object; and independently creating targetless snapshots of the storage object for each targetless snapshot schedule associated with the policy objects associated with the storage object. Some implementations comprise setting a count that indicates a maximum number of targetless snapshots to be maintained in accordance with the targetless snapshot schedule associated with one of the policy objects. Some implementations comprise setting a time interval that indicates an elapsed time between creation of successive targetless snapshots in accordance with the targetless snapshot schedule associated with one of the policy objects. Some implementations comprise creating a schedule ID that identifies the targetless snapshot schedule associated with one of the policy objects. Some implementations comprise using metadata to learn which schedule IDs are associated with a selected storage object. Some implementations comprise using the learned schedule IDs to identify corresponding policy objects. Some implementations comprise applying schedules defined by the identified policy objects to the selected storage object. Some implementations comprise creating new targetless snapshots at time intervals specified by the identified policy objects. Some implementations comprise discarding an oldest snapshot created under a schedule if a count specified for that schedule would be exceeded by creating a new targetless snapshot under that schedule.

With a computer-readable storage medium that stores instructions that when executed by a computer cause the computer to perform a method for using a computer system to create targetless snapshots, the method may comprise: maintaining a plurality of policy objects, each policy object defining a corresponding targetless snapshot schedule; associating selected ones of the policy objects with a storage object; and independently creating targetless snapshots of the storage object for each targetless snapshot schedule associated with the policy objects associated with the storage object. The method may further comprise: learning schedule IDs associated with a selected storage object; using the learned schedule IDs to identify corresponding policy objects; applying schedules defined by the identified policy objects to the selected storage object; creating new targetless snapshots at time intervals specified by the identified policy objects; and discarding an oldest snapshot created under a schedule if a count specified for that schedule would be exceeded by creating a new targetless snapshot under that schedule.

Other aspects, features, and implementations may become apparent in view of the detailed description and figures.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage media. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer.

Some aspects, features, and implementations described herein may include machines such as computers, electronic components, optical components, and processes such as computer-implemented procedures and steps. It will be apparent to those of ordinary skill in the art that the computer-implemented procedures and process steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
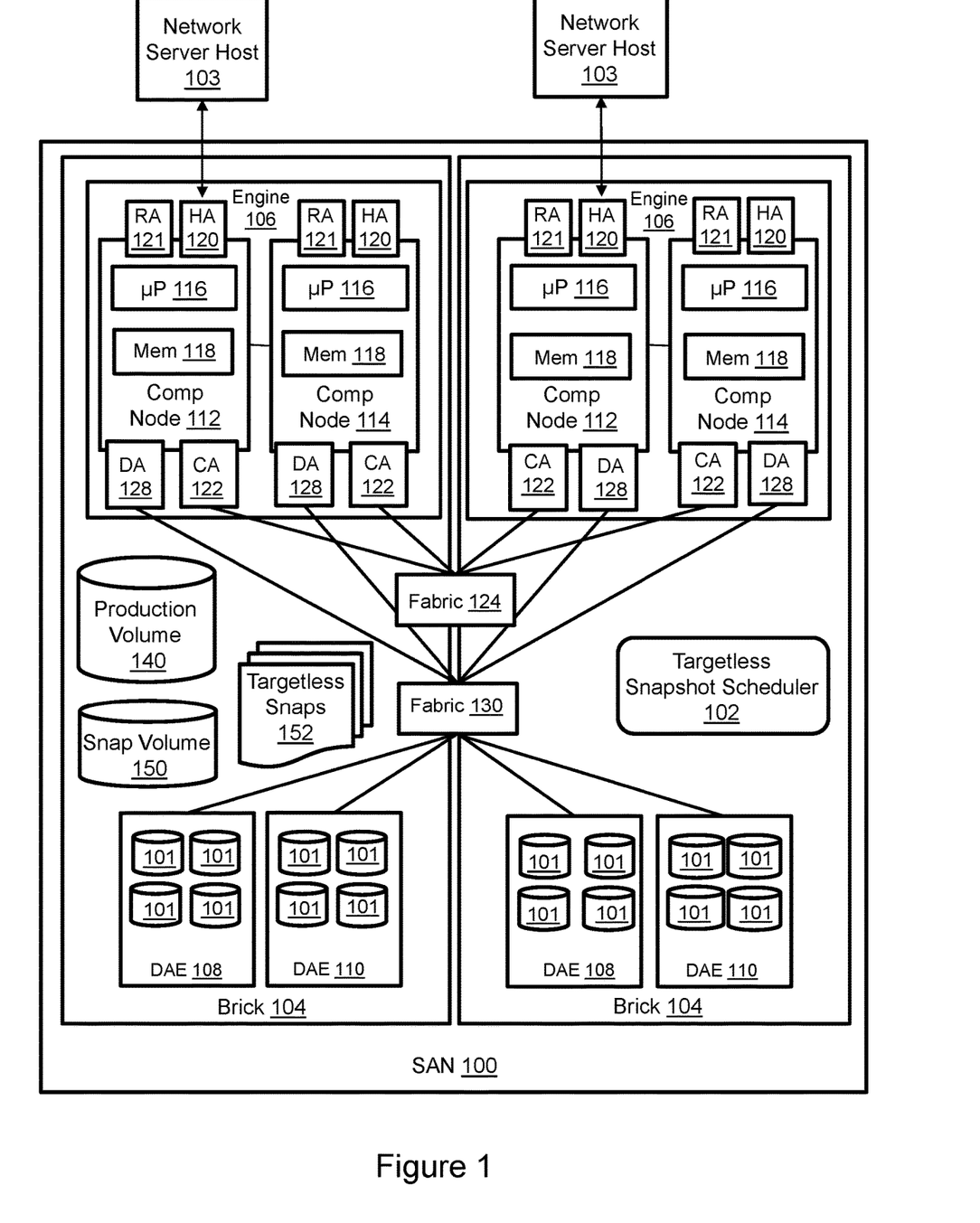
FIG. 1 illustrates a storage array with a targetless snapshot scheduler that implements multiple concurrent targetless snapshot schedules that are applied to the same storage object.

FIG. 1 illustrates a storage area network (SAN) 100 with a targetless snapshot scheduler 102 that implements multiple concurrent targetless snapshot schedules that are applied to the same storage object. Targetless snaps may be generated manually or automatically. One drawback of automatic targetless snap creation is that storage system resources may be consumed to exhaustion if old snaps are not discarded. It is possible to automate discard of targetless snaps, e.g. by discarding the oldest snaps. However, such a technique inhibits implementation of different targetless snapshot schedules. For example, an automated integrated targetless snapshot schedule for a storage object may include both a low count, long interval schedule and a high count, short interval schedule but due to age-based discard creation of snaps pursuant to the short interval schedule will cause discard of the long interval schedule snaps, thereby negating the utility of the long interval schedule. As will be explained below, the targetless snapshot scheduler helps to overcome this problem.

The specifically illustrated SAN 100 is a storage array that includes a network of computing nodes 112, 114 that manage access to arrays of drives using interconnecting fabrics 124, 130 rather than switches for communication. The SAN is depicted in a simplified data center environment that includes two network servers 103 that functions as "hosts." The network servers include volatile memory, non-volatile storage, one or more tangible processors, and a hypervisor or containers. Instances of applications (host applications) running on each network server use data that is maintained by the SAN. Examples of host applications may include email programs, inventory control programs, and accounting programs, for example and without limitation. The SAN 100 includes one or more bricks 104. Each brick includes an engine 106 and one or more drive array enclosures (DAEs) 108, 110. Each DAE includes managed drives 101 that are non-volatile storage media such as, without limitation, solid-state drives (SSDs) based on EEPROM technology such as NAND and NOR flash memory and hard disk drives (HDDs) with spinning disk magnetic storage media. Drive controllers may be associated with the managed drives as is known in the art. Each engine 106 includes a pair of interconnected computing nodes 112, 114, which may be referred to as "storage directors." Although some of those skilled in the art may refer to the computing nodes as "hosts," that naming convention is avoided in this disclosure to distinguish the network server hosts 103 from the computing nodes 112, 114. Nevertheless, the host applications could run on the computing nodes, e.g. on virtual machines or in containers. Each computing node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each computing node may allocate a portion of its local memory to a logical shared memory that can be accessed by all computing nodes using direct memory access (DMA) techniques. Each computing node includes one or more host adapters (HAs) 120 for communicating with the hosts 103. Each host adapter has resources for servicing input-output commands (IOs) from the hosts. The resources may include processors, volatile memory, and ports via which the hosts may access the SAN. Each computing node also includes a remote adapter (RA) 121 for communicating with other storage systems. Each computing node also includes one or more drive adapters (DAs) 128 for communicating with the managed drives 101 in the DAEs 108, 110. Each drive adapter has processors, volatile memory, and ports via which the computing node may access the DAEs for servicing IOs. Each computing node may also include one or more channel adapters (CAs) 122 for communicating with other computing nodes via an interconnecting fabric 124. The paired computing nodes 112, 114 of each engine 106 provide failover protection and may be directly interconnected by communication links. An interconnecting fabric 130 enables implementation of an N-way active-active backend. A backend connection group includes all drive adapters that can access the same drive or drives. In some implementations every drive adapter 128 in the SAN can reach every DAE via the fabric 130. Further, in some implementations every drive adapter in the SAN can access every managed drive 101 in the SAN.

Data associated with the hosted application instances running on the hosts 103 is maintained on the managed drives 101. The managed drives 101 are not discoverable by the hosts 103 but the SAN 100 creates a storage object such as production volume 140 that can be discovered and accessed by the hosts. The production volume is a logical storage device that may be referred to as a production device or production LUN, where the logical unit number (LUN) is a number used to identify logical storage volumes in accordance with the small computer system interface (SCSI) protocol. From the perspective of the hosts 103, the production volume 140 is a single drive having a set of contiguous fixed-size logical block addresses (LBAs) on which data used by the instances of the host application resides. However, the host application data is stored at non-contiguous addresses on various managed drives 101. Metadata that maps between the production volume LBAs and addresses in the managed drives is maintained by the computing nodes, e.g. in the shared memory. The hosts send IOs to access LBAs of the production volume. Due to the above-described configuration the SAN functions as a block-based storage system without information that is indicative of higher-level host application data structures such as files. Filesystems indicative of such higher-level data structures may be maintained by the hosts. Although only one production volume is illustrated, the SAN may contemporaneously maintain multiple production volumes.

Traditional snapshots of the production volume 140 may be written to a snap volume 150, which may be local or remote. Targetless snaps 152 of the production volume 140 are created by the targetless snapshot scheduler 102. New targetless snaps are created as changes are made to the production volume 140. Specifically, snapshot deltas are created using tables and pointers to the original data such that the original data and changed data continue to be stored on the managed drives. The original data may be overwritten when all associated targetless snaps have been discarded.

Figure 2:
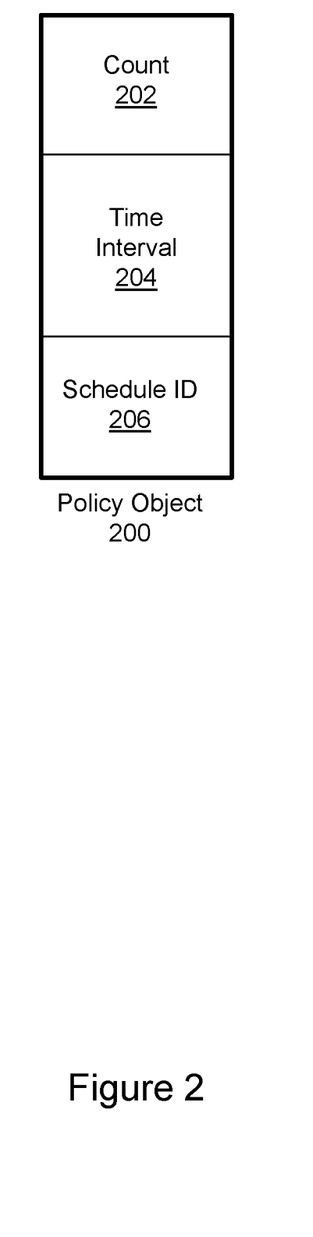
FIG. 2 illustrates a policy object that is used by the targetless snapshot scheduler.

Referring to FIG. 2, a policy object 200 defines aspects of a schedule for creation of targetless snapshots. Attributes of the policy object 200 include a count 202, a time interval 204, and a schedule ID 206. The count 202 indicates the maximum number of targetless snaps to be maintained. Old targetless snaps in excess of the count are discarded to maintain compliance with the count. The time interval 204 is the period of elapsed time between creation of successive targetless snaps. The schedule ID 206 is an identifier for the targetless snapshot schedule, and thus for the policy object.

Figure 3:
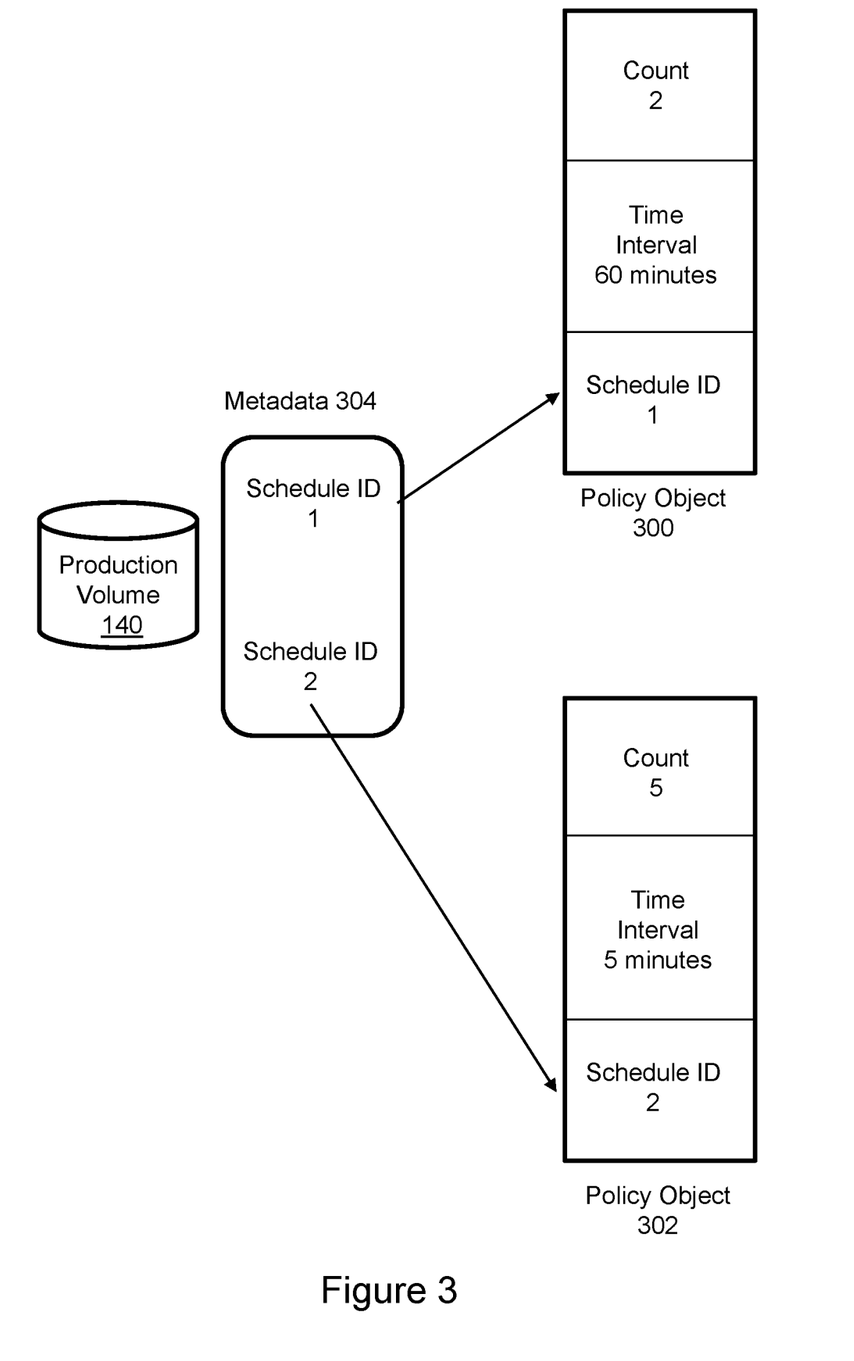
FIG. 3 illustrates association of multiple policy objects with a single storage object.

FIG. 3 illustrates association of multiple policy objects 300, 302 with the same storage object, i.e. production volume 140. The targetless snap schedules defined by each policy object are independent and at least one of the attributes of the schedules differ. In the illustrated example policy object 300 has a count value of 2, a time interval of 60 minutes, and a schedule ID "1." Policy object 302 has a count value of 5, a time interval of 5 minutes, and a schedule ID "2." Both schedule IDs are associated with the production volume 140, e.g., in associated metadata 304 stored in the shared memory. The targetless snapshot scheduler 102 (FIG. 1) uses the metadata 304 to locate matching schedule IDs in the policy objects to determine which schedules to apply to the production volume 140. It should be understood that there may be many production volumes and many different policy objects and schedules, with only some of the schedules being applied to any given production volume.

Figure 4:
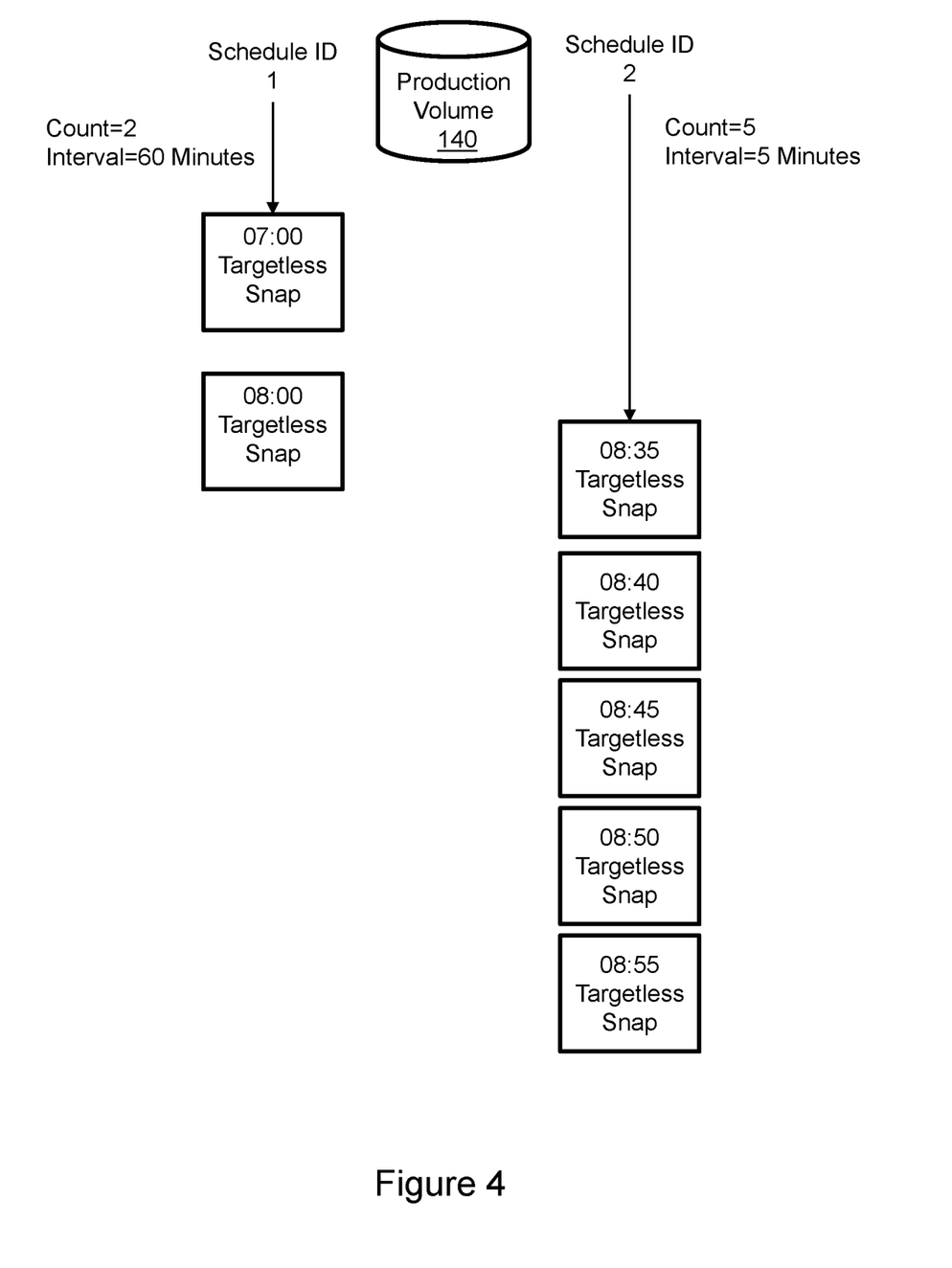
FIGS. 4 through 6 illustrate contemporaneous generation of targetless snapshots of a storage object in accordance with multiple schedules.
Figure 5:
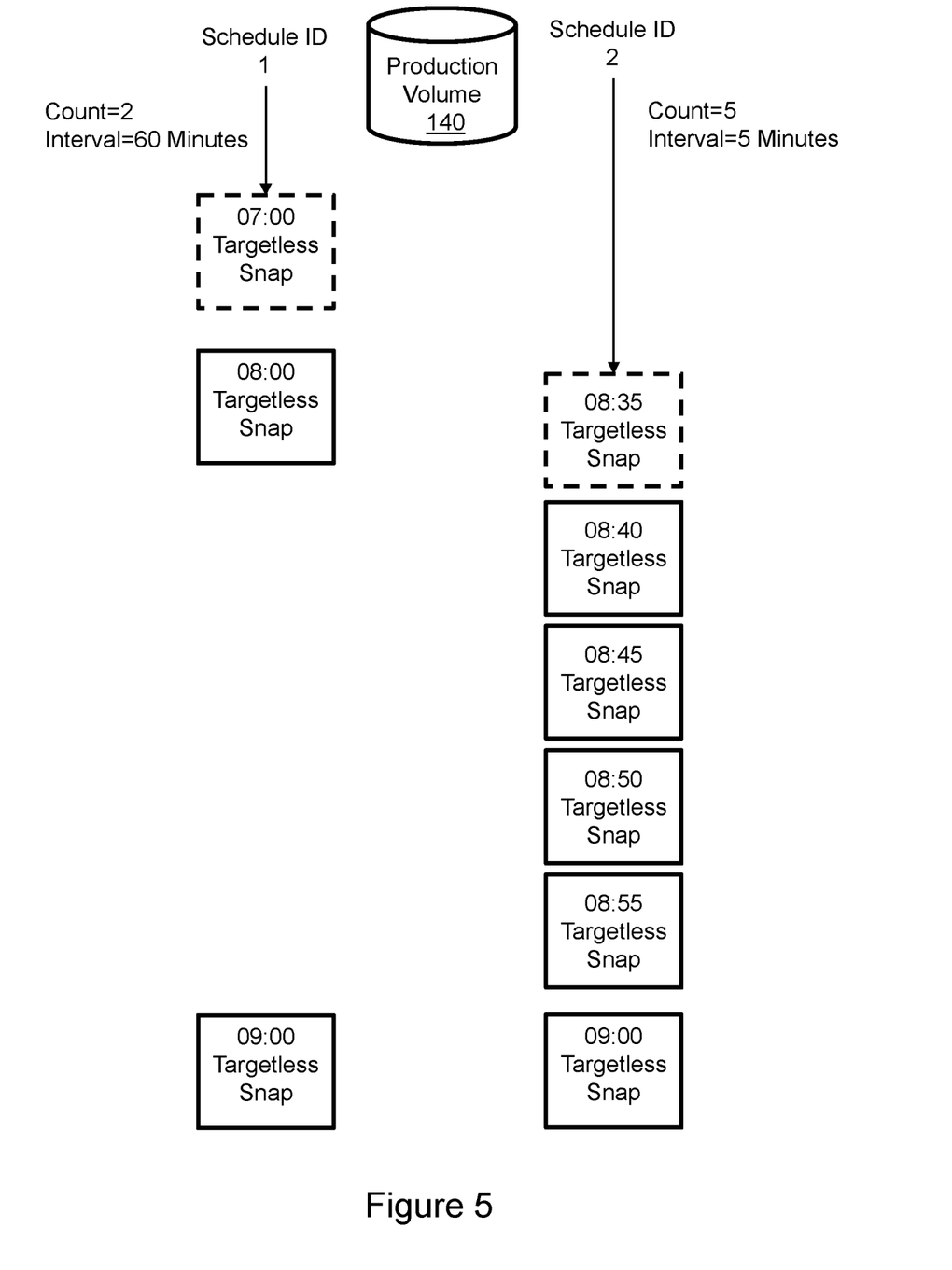
Figure 6:
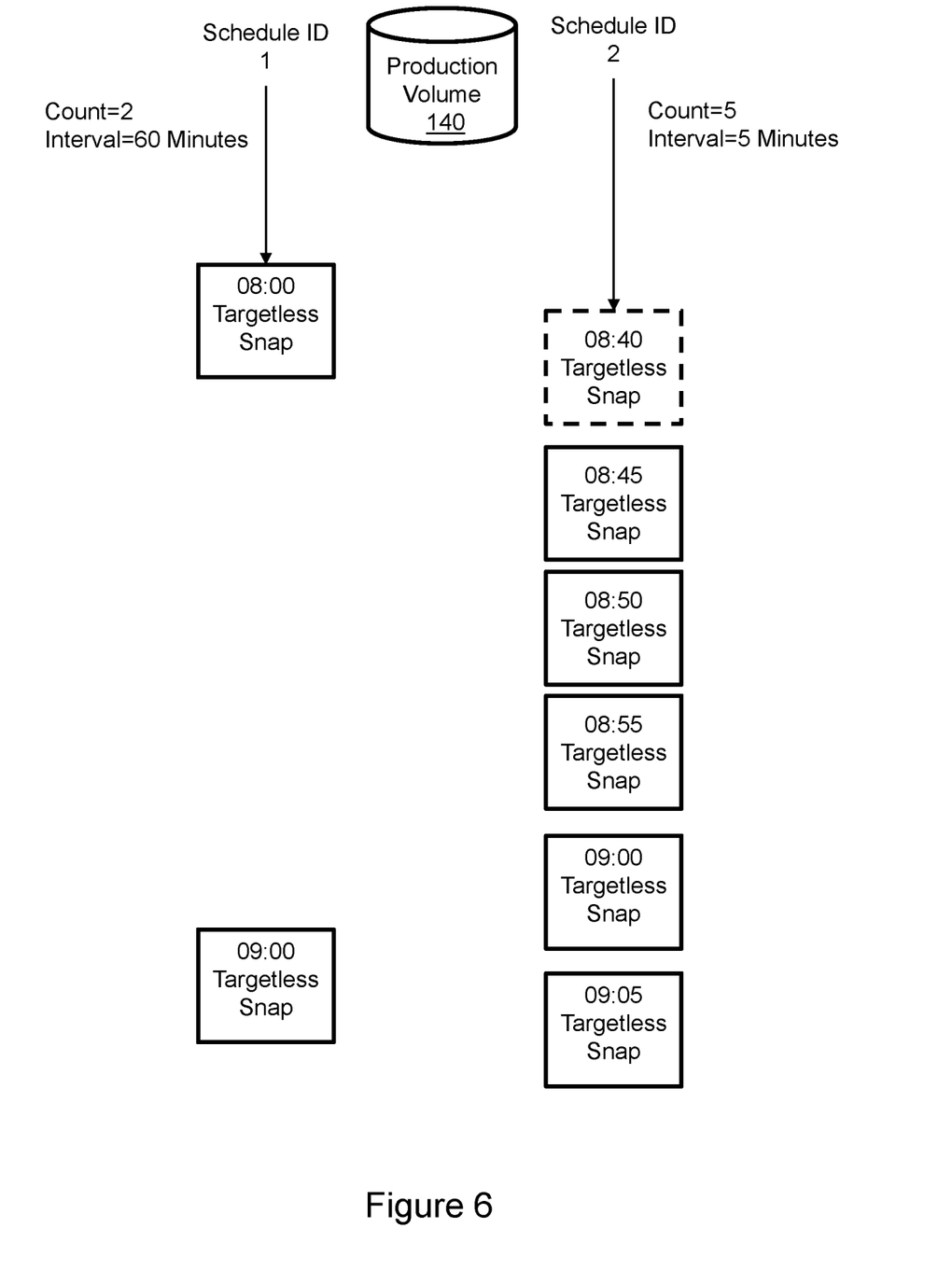

FIGS. 4 through 6 illustrate contemporaneous generation of targetless snapshots of a storage object in accordance with multiple schedules. Referring to FIG. 4, in accordance with the targetless snap creation schedule associated with schedule ID 1 as defined in policy object 300 (FIG. 3), up to two targetless snaps of production volume 140 are maintained and the snaps are created at 60-minute intervals, resulting in an 07:00 targetless snap and an 08:00 targetless snap, where 07:00 and 08:00 are times of day at which the snapshots were created. In accordance with the targetless snap creation schedule associated with schedule ID 2 as defined in policy object 302 (FIG. 3), up to five targetless snaps of production volume 140 are maintained and the snaps are created at 5-minute intervals, resulting in an 08:35 targetless snap, an 08:40 targetless snap, an 08:45 targetless snap, an 08:50 targetless snap, and an 08:55 targetless snap.

Referring to FIG. 5, at time 09:00 new snaps are created for both schedule ID 1 and schedule ID 2 because the 60-minute and 5-minute intervals intersect. In order to avoid exceeding the count value of schedule ID 1, i.e. count=2, one of the existing targetless snaps taken under schedule ID 1 is discarded. The oldest snap is selected as a default so in the illustrated example the 07:00 targetless snap is discarded. In order to avoid exceeding the count value of schedule ID 2, i.e. count=5, one of the existing targetless snaps taken under schedule ID 2 is discarded. The oldest snap is selected as a default so in the illustrated example the 08:35 targetless snap is discarded. Because the schedules are independent, discard of the 08:00 schedule ID 1 snap is not considered for maintenance of the schedule ID 2 count. Although the result of the contemporaneous schedules is two 09:00 targetless snaps, those snaps are not identical because, among other things, the elapsed time since the previous snap differs. It will be appreciated that the total number of snaps for a schedule ID may be less than the count value in certain circumstances, so an old snap is not necessarily discarded each time a new snap is created.

Referring to FIG. 6, at 09:05 a new snap is created for schedule ID 2 based on the 5-minute creation interval. In order to avoid exceeding the count value of schedule ID 2, i.e. 5, one of the existing targetless snaps taken under schedule ID 2 is discarded. The oldest snap is selected as a default so in the illustrated example the 08:40 targetless snap is discarded. The 08:00 targetless snap created pursuant to schedule ID 1 is not considered for discard because it was created based on a different schedule ID, i.e. the independent schedule associated with schedule ID 1. This illustrates an advantage over integrated schedules in which the oldest snap for the storage object is discarded. In a system that uses integrated schedules some or all of the low count, long interval snaps (e.g. as in schedule ID 1) may be discarded due to creation of high count, short interval snaps (e.g. as in schedule ID 2).

Figure 7:
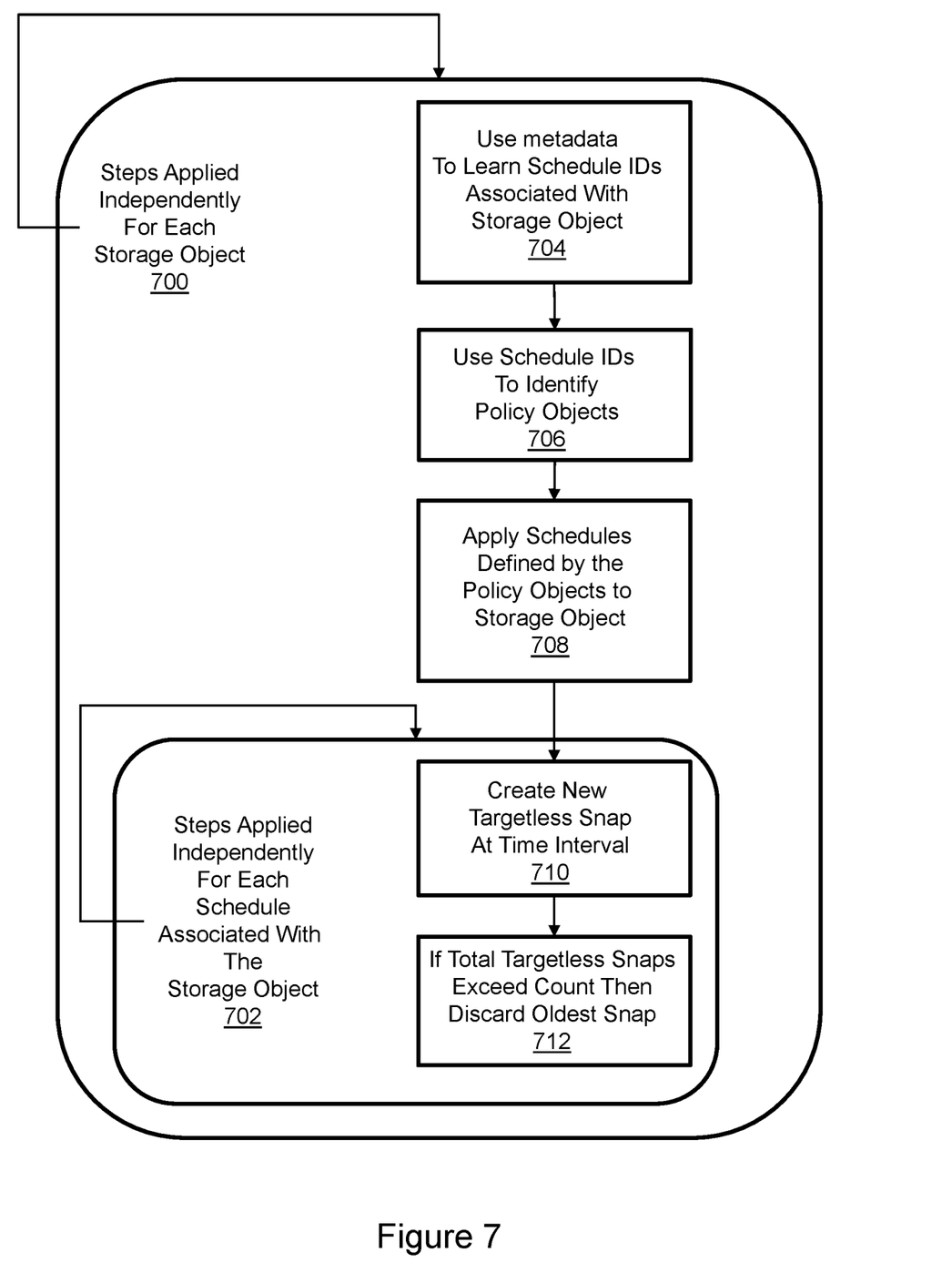
FIG. 7 illustrates operation of the targetless snapshot scheduler in greater detail.

FIG. 7 illustrates operation of the targetless snapshot scheduler in greater detail. The illustrated group 700 of steps are applied independently for each storage object for which targetless snaps are created. Consequently, when the same policy object is associated with multiple storage objects the corresponding targetless snapshot schedule is applied independently to each of the storage objects. For example, snaps of a first production volume are not included in the count of snaps of a second production volume. A sub-group 702 of the steps are applied independently for each targetless snapshot schedule associated with a selected storage object. Consequently, when multiple policy objects are associated with a single storage object the corresponding schedules are applied independently. For example, snaps of a production volume created pursuant to a first schedule are not included in the count of snaps of the production volume created pursuant to a second schedule. Step 704 is to use the metadata in the shared memory to learn the schedule IDs associated with a selected storage object. The schedule IDs are used to identify corresponding policy objects as indicated in step 706. The schedules defined by the identified policy objects are applied to the storage object as indicated in step 708. Pursuant to each of those schedules, new targetless snaps are created at the time interval included in the corresponding policy object as indicated at step 710. If the total number of targetless snaps inclusive of the new snap exceeds the count, then the oldest snap is discarded as indicated in step 712. The steps are repeated in continuous loops for each storage object and schedule.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
    a data storage system comprising:
        a plurality of compute nodes interconnected with a plurality of drives;
        a storage object on which data is logically stored, the storage object being backed by the drives; and
        a targetless snapshot scheduler than generates targetless snapshots of the storage object, wherein the targetless snapshots are stored on the drives and are characterized by absence of a target snap volume, the targetless snapshot scheduler comprising:
            a plurality of policy objects, each policy object defining a corresponding targetless snapshot schedule;
            metadata that associates multiple selected ones of the policy objects with the storage object;
            instructions that independently create targetless snapshots of the storage object pursuant to each of a plurality of targetless snapshot schedules associated with the policy objects associated with the storage object such that targetless snapshots are created at first time value intervals pursuant to a first snapshot schedule and targetless snapshots are created at second time value intervals pursuant to a second snapshot schedule, wherein the first time value differs from the second time value and two targetless snapshots are created when the first time value intervals intersect with the second time value intervals; and
            instructions that independently discard targetless snapshots of the storage object pursuant to each of the plurality of policy objects associated with the storage object such that the targetless snapshots created pursuant to a first policy object count are not selected for discard pursuant to a second policy object count.

2. The apparatus of claim 1 wherein each policy object comprises a count that indicates a maximum number of targetless snapshots to be maintained in accordance with the targetless snapshot schedule associated with the policy object.

3. The apparatus of claim 2 wherein each policy objects comprises a time interval that indicates an elapsed time between creation of successive targetless snapshots in accordance with the targetless snapshot schedule associated with the policy object.

4. The apparatus of claim 3 wherein each policy objects comprises a schedule ID that identifies the targetless snapshot schedule associated with the policy object.

5. The apparatus of claim 4 wherein the targetless snapshot scheduler comprises instructions that use metadata to learn which schedule IDs are associated with a selected storage object.

6. The apparatus of claim 5 wherein the targetless snapshot scheduler comprises instructions that use the learned schedule IDs to identify corresponding policy objects.

7. The apparatus of claim 6 wherein the targetless snapshot scheduler comprises instructions that apply schedules defined by the identified policy objects to the selected storage object.

8. The apparatus of claim 7 wherein the targetless snapshot scheduler comprises instructions that create new targetless snapshots at time intervals specified by the identified policy objects.

9. The apparatus of claim 8 wherein the targetless snapshot scheduler comprises instructions that discard an oldest snapshot created under a schedule if a count specified for that schedule would be exceeded by creating a new targetless snapshot under that schedule.

10. A method comprising:
    in a data storage system comprising a plurality of compute nodes interconnected with a plurality of drives and a storage object on which data is logically stored, the storage object being backed by the drives:
        maintaining a plurality of policy objects, each policy object defining a corresponding targetless snapshot schedule;
        associating multiple selected ones of the policy objects with the storage object;
        independently creating targetless snapshots of the storage object pursuant to each of a plurality of targetless snapshot schedules associated with the policy objects associated with the storage object such that targetless snapshots are created at first time value intervals pursuant to a first snapshot schedule and targetless snapshots are created at second time value intervals pursuant to a second snapshot schedule, wherein the first time value differs from the second time value and two targetless snapshots are created when the first time value intervals intersect with the second time value intervals, wherein the targetless snapshots are stored on the drives and are characterized by absence of a target snap volume; and independently discarding targetless snapshots of the storage object pursuant to each of the plurality of policy objects associated with the storage object such that the targetless snapshots created pursuant to a first policy object count are not selected for discard pursuant to a second policy object count.

11. The method of claim 10 comprising setting a count that indicates a maximum number of targetless snapshots to be maintained in accordance with the targetless snapshot schedule associated with one of the policy objects.

12. The method of claim 11 comprising setting a time interval that indicates an elapsed time between creation of successive targetless snapshots in accordance with the targetless snapshot schedule associated with one of the policy objects.

13. The method of claim 12 comprising creating a schedule ID that identifies the targetless snapshot schedule associated with one of the policy objects.

14. The method of claim 13 comprising using metadata to learn which schedule IDs are associated with a selected storage object.

15. The method of claim 14 comprising using the learned schedule IDs to identify corresponding policy objects.

16. The method of claim 15 comprising applying schedules defined by the identified policy objects to the selected storage object.

17. The method of claim 16 comprising creating new targetless snapshots at time intervals specified by the identified policy objects.

18. The method of claim 17 comprising discarding an oldest snapshot created under a schedule if a count specified for that schedule would be exceeded by creating a new targetless snapshot under that schedule.

19. A computer-readable storage medium storing instructions that when executed by a computer cause the computer to perform a method for using a computer system to create targetless snapshots, the method comprising:

maintaining a plurality of policy objects, each policy object defining a corresponding targetless snapshot schedule;

associating multiple selected ones of the policy objects with a storage object;

independently creating targetless snapshots of the storage object pursuant to each of a plurality of targetless snapshot schedules associated with the policy objects associated with the storage object such that targetless snapshots are created at first time value intervals pursuant to a first snapshot schedule and targetless snapshots are created at second time value intervals pursuant to a second snapshot schedule, wherein the first time value differs from the second time value and two targetless snapshots are created when the first time value intervals intersect with the second time value intervals, wherein the targetless snapshots are stored on the drives and are characterized by absence of a target snap volume; and instructions that independently discard targetless snapshots of the storage object pursuant to each of the plurality of policy objects associated with the storage object such that the targetless snapshots created pursuant to a first policy object count are not selected for discard pursuant to a second policy object count.

20. The computer-readable storage medium of claim 19 wherein the method further comprises:

learning schedule IDs associated with a selected storage object;

using the learned schedule IDs to identify corresponding policy objects;

applying schedules defined by the identified policy objects to the selected storage object;

creating new targetless snapshots at time intervals specified by the identified policy objects; and discarding an oldest snapshot created under a schedule if a count specified for that schedule would be exceeded by creating a new targetless snapshot under that schedule.

* * * * *